United States Patent
Arora et al.

(10) Patent No.: US 11,510,043 B2
(45) Date of Patent: Nov. 22, 2022

(54) SYSTEM FOR PERFORMANCE AND INSPECTION OF FACILITY MAINTENANCE AND CUSTODIAL PROCESSES

(71) Applicant: LTech Ventures, LLC, Chadds Ford, PA (US)

(72) Inventors: Manik Arora, West Chester, PA (US); Tracy Davis, Alpharetta, GA (US)

(73) Assignee: LTech Ventures, LLC, Chadds Ford, PA (US)

( * ) Notice: Subject to any disclaimer, the term of this patent is extended or adjusted under 35 U.S.C. 154(b) by 0 days.

(21) Appl. No.: 17/717,341

(22) Filed: Apr. 11, 2022

(65) Prior Publication Data

US 2022/0329999 A1 Oct. 13, 2022

Related U.S. Application Data

(60) Provisional application No. 63/173,653, filed on Apr. 12, 2021.

(51) Int. Cl.
*H04W 4/80* (2018.01)
*H04W 4/33* (2018.01)
*G06Q 10/00* (2012.01)
*G06Q 10/06* (2012.01)

(52) U.S. Cl.
CPC ........ *H04W 4/80* (2018.02); *G06Q 10/06311* (2013.01); *G06Q 10/20* (2013.01); *H04W 4/33* (2018.02)

(58) Field of Classification Search
CPC ......... H04W 4/80; H04W 4/33; H04W 76/10; H04W 84/18; H04W 88/06; G06Q 10/06311; G06Q 10/20; H04M 1/72412; H04M 2250/02
See application file for complete search history.

(56) References Cited

U.S. PATENT DOCUMENTS 9,924,313 B1 * 3/2018 Akselrod ................ H04W 4/33

OTHER PUBLICATIONS

Kastner, Wolfgang, et al. "Communication systems for building automation and control." Proceedings of the IEEE 93.6 (2005): 1178-1203. (Year: 2005).*

* cited by examiner

*Primary Examiner* — Sharad Rampuria
(74) *Attorney, Agent, or Firm* — White and Williams LLP

(57) ABSTRACT

A method for performing maintenance of a facility for use with a server, a plurality of communication sensors arranged throughout the facility, and a portable communication device, the method for use with a cleaning module, quality control module, and inspection module.

4 Claims, 6 Drawing Sheets

SYSTEM FOR PERFORMANCE AND INSPECTION OF FACILITY MAINTENANCE AND CUSTODIAL PROCESSES

CROSS-REFERENCE TO RELATED APPLICATIONS

This application claims the benefit of U.S. patent application Ser. No. 63/173,653, filed on Apr. 12, 2021, the contents of which are hereby incorporated by reference in its entirety.

TECHNICAL FIELD

The system of current invention relates generally to facility maintenance, and more specifically to the computerized processes and methods for completing sanitization tasks, quality control, and the inspection of the tasks throughout a facility or group of facilities using a combination of real-time and historical data.

BACKGROUND

The system of the current invention is designed to facilitate the sanitary maintenance, review, and inspection of a facility's elements or assets to ensure the facility's locations and assets meet minimum requirements for customer- and guest-facing experiences. To ensure a safe environment, both for patronizing and employing, making certain that environments, assets, and elements are thoroughly cleaned and in proper working order—and that the process is conducted and completed in a manner that aligns with the facility's protocol—is imperative to operation.

Some of the most complex problems with prior systems are a result of an inability to efficiently track and utilize historical data of work completed in conjunction with real-time data, as well as the lack of ability to immediately address concerns that arise because of the conjunctive real-time and historical datasets. These issues presented problems amongst patrons and consumers, who expect to enjoy a facility that is clean, safe, and properly functional, as well as with facility employees, who may be unable, due to lack of sufficient information, or underqualified to address identifiable issues with a facility's elements or assets.

To combat such hardships, the system of current invention employs the historical logging of completed cleaning and quality control activities most recently conducted within the location in question. Additionally, the overall system workflow is highly configurable to suit the needs of various organizations, and to address the varying needs of different venues or locations within a single corporate or organizational entity. The inspection module within the system of current invention is responsible for providing a reliable history of work, facilitating the immediate creation and/or scheduling of follow-up work, and concise communication between end users, which may also be visualized on a map display within the system.

BRIEF DESCRIPTION OF DRAWINGS

The accompanying drawings illustrate one or more embodiments and/or aspects of the disclosure and, together with the written description, serve to explain the principles of the disclosure, wherein.

SUMMARY OF THE INVENTION

Figure 1:
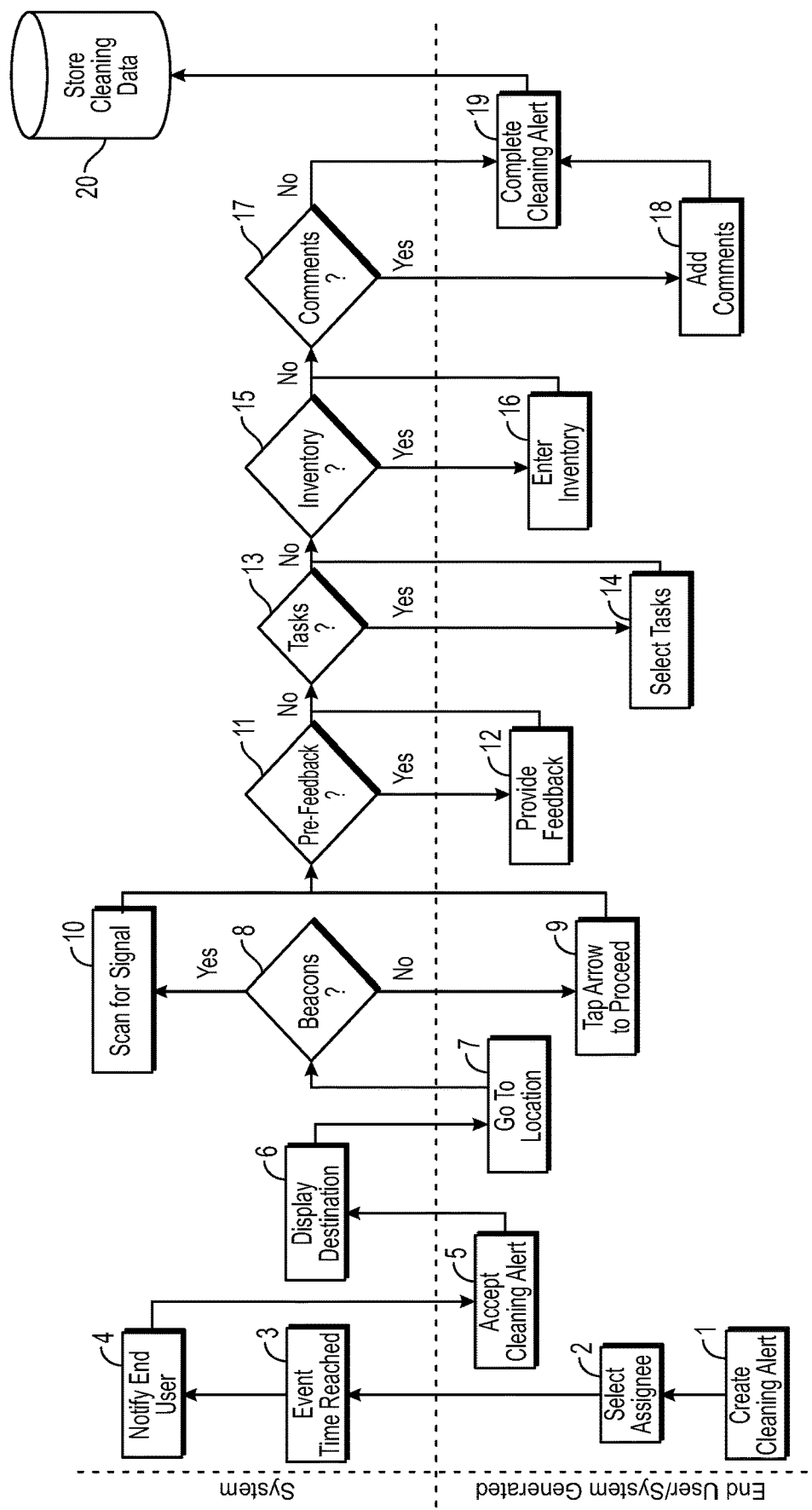
FIG. 1 illustrates an exemplary process for end user interaction with the cleaning module according to an aspect of the system of the present disclosure.

A method for performing maintenance of a facility for use with a server, a plurality of communication sensors arranged throughout the facility, and a portable communication device, the method for use with a cleaning module, quality control module, and inspection module.

DETAILED DESCRIPTION

To promote an understanding of the principles of the current disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated and would normally occur to one skilled in the art to which the disclosure relates. All limitations of scope should be determined in accordance with and as expressed in the claims.

Whether a term is capitalized does not consider it definitive or limiting of the meaning of a term. As used in this document, a capitalized term shall have the same meaning as an uncapitalized term, unless the context of the usage specifically indicates that a more restrictive meaning for the capitalized term is intended. However, the capitalization or lack thereof within the remainder of this document is not intended to be necessarily limiting unless the context clearly indicates that such limitation is intended.

Overview

Aspects of the system of the current disclosure generally relate to the computerized monitoring of the movement of people and assets to help public and private facilities improve the overall customer experience in one or more facility locations (e.g., restrooms, meeting rooms, malls, retail stores, restaurants, etc.). It is common for facilities to abide by scheduled cleaning and maintenance practices, in which a custodian, or otherwise accountable employee, conducts a pre-planned and scheduled cleaning of a given location or group of locations. Upon completion of the scheduled cleaning event, a supervisory or managerial individual would then review the actions taken while completing the scheduled cleaning event and evaluate the quality of the work that may have been performed, in accordance with the statutes and guidelines of the employing facility. While custodial tasks are a frequent and necessary occurrence across organizations, less frequent evaluations regarding the maintenance and performance of assets and/or elements within a given location or group of locations are equally imperative to the facility's operations and overall customer experience.

The system of the current disclosure is designed with the purpose of creating a system that can use artificial intelligence, derived by sensor data, to determine the optimal frequency with which to clean and sanitize various locations. By using 3$^{rd}$ party sensors to gather data, the system of the current disclosure identifies the optimal time for cleaning and sanitation to occur. Additionally, the system's integration with 3$^{rd}$ party sensors allows for proactive monitoring and alerts to be generated when assets or locations are out of compliance or in need of maintenance.

System Structure

Figure 4:
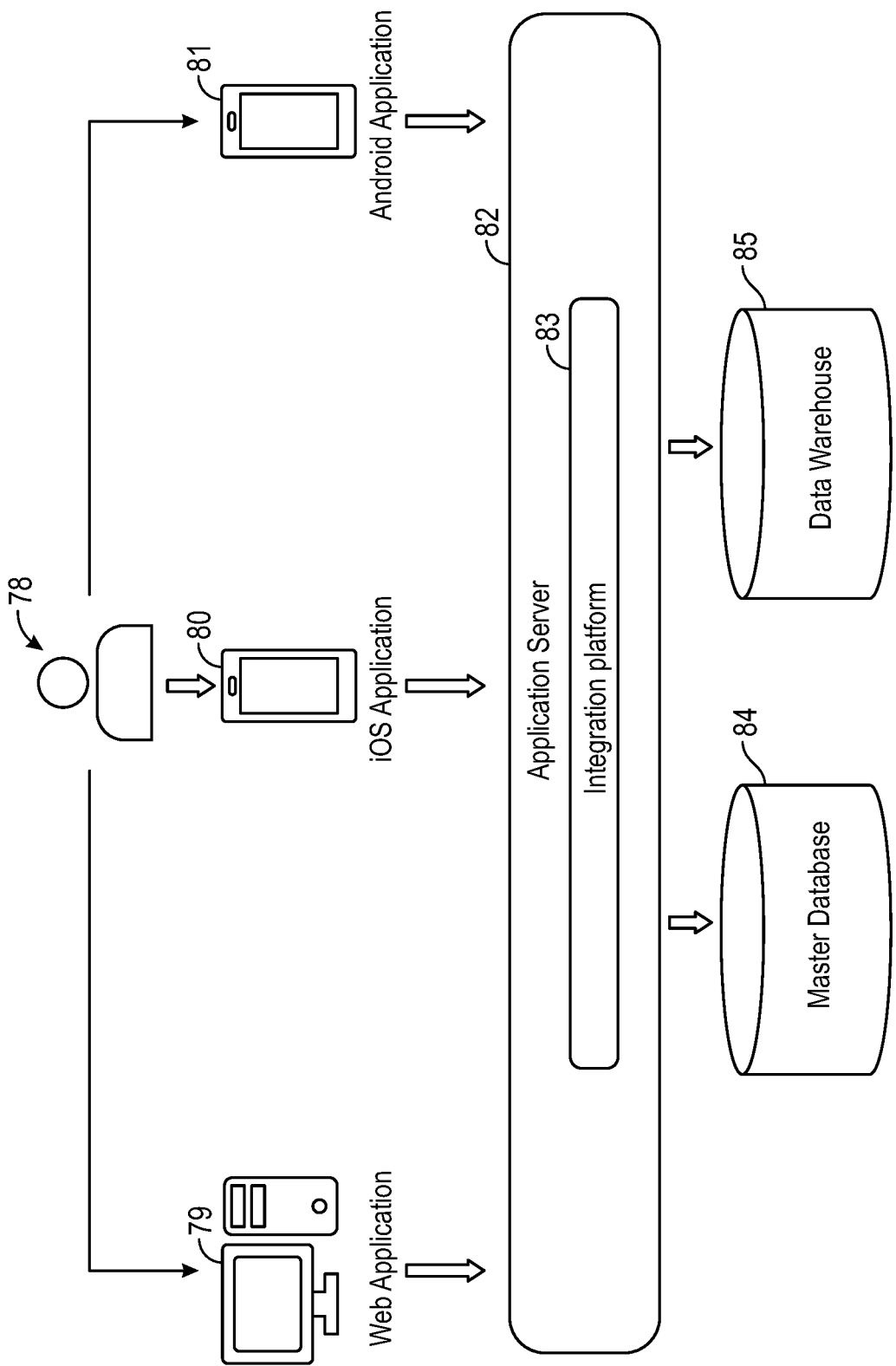
FIG. 4 illustrates an exemplary high-level build according to an aspect of the system of the present disclosure.

Referring now to the figures, for the purpose of example and explanation of the fundamental processes and components of the disclosed systems and methods, reference is made to FIG. 4, which illustrates an exemplary, high-level overview of the system of the present disclosure. The proceeding example depicted in FIG. 4 is merely a single probable scenario, and other aspects may be used concurrently therewith. In this non-limiting example and those to follow throughout the remainder of this document, it is assumed the end user 78 possesses a valid set of credentials for the system and can successfully authenticate via Application Programming Interface (API) connection against the system's database 84.

As depicted in FIG. 4, an end user 78 may gain access to the system through any of three or more mediums. The first point of access may be through the system's web component 79, in which the end user 78 provides a valid username and password to gain access to the system. The second point of access to the system of current invention is via a natively built iOS mobile application 80, which may also require a set of valid user credentials. The third point of access to the system is via a natively built Android mobile application 81, which may require a set of valid user credentials. All data collected, created, or otherwise manipulated within the system through any of the points of access may be then transported via the system's application server 82 and subsequently through the integration platform 83 to be stored in both a master database instance 84 and in the system's data warehouse 85.

In accordance with Software as a Service (SaaS) models, the system of the current invention may include a production environment, hosted by an Infrastructure as a Service (IaaS) cloud provider. Per FIG. 6, the production system may be hosted primarily in the cloud 91. The resources contained in the cloud 91 are used to host the system's mobile application component 80 and the system's web component 79. To utilize the system, Client (A, B, C) 103, 104, 105 may navigate to the desired point of access known as the login portal 102, which may be used as the point of access for end users, regardless of the subscription 92 to which their account may be associated. Once successfully authenticated, the end user is provided access in accordance with the subscription 92, 93, 94 to which their account is associated. The master database 98 stores transactional data and contains the "last known record" of changes. The master database stores data to be processes through integration platform and stored within each client's data warehouse. Each subscription also has a database assigned that serves as a data warehouse for the client and contains a history of changes for that client. Both the web instance and the mobile instance of the system may access the same Data warehouse (A, B, C) 99, 100, 101 associated with the respective client ID. In one example, Subscription A 92 may contain its own independent and isolated Data warehouse instance, Data warehouse A 99. Similarly, Subscription B 93 and Subscription C 94 may have data warehouses Data warehouse B 100 and Data warehouse C 101, respectively. Subscription A 92 may authorize feature access to Client A 103 based on the feature selections made by the end user at the time the subscription was created or thereafter.

The system can accept data from external parties 107 (e.g., hardware devices, data providers, etc.) if Client A 103 may wish to employ other data sources to enhance the user experience and data quality.

In one example, there may be three distinct modules constructed within the system from which a client can choose. It may be possible to use as few as one or as many as all three modules in a single subscription instance. Assume, for example, the system has three independent and active subscription instances. Client A 103 successfully authenticates to the login portal 102 and is authorized to access their subscription instance Subscription A 92, which may employ all three available modules: cleaning module 95, QC module 96, and inspection module 97. The cleaning module 95 may allow the Client A 103 to interact with features, functionality, and datasets that are unique to the workflow of the given module 95. The QC module 96 may allow the client 103 to interact with workflows and datasets that are unique to the module 96 while also providing the ability to reference and analyze data collected from or throughout the use of the cleaning module 95. Similarly, the inspection module 97 also active within Subscription A 92 may provide additional interactions with the preceding modules, as well as expanded features, functionality, and datasets. All data collected across the modules and within the respective web and mobile system components, may be stored in a single database instance 98 that may be reserved solely for Subscription 92 and its related data.

Continuing with the current example, Client B 104 may access the system through the login portal 102 and interact with two of the available modules. In this example, access may be granted to the cleaning module 95 and its workflow, as well as the QC module 96 and its workflow. The two modules may collect and exchange data in the same manner as the Client A's 103 scenario. This Subscription B 93 would not have access to features or functionality beyond what exists in the two modules. Client C 105 may only have use of the inspection module 97 as part of their Subscription C 94 within the system of current invention, which would then restrict their features and functionality to those contained within the inspection module 97.

Location Hierarchy

Figure 5:
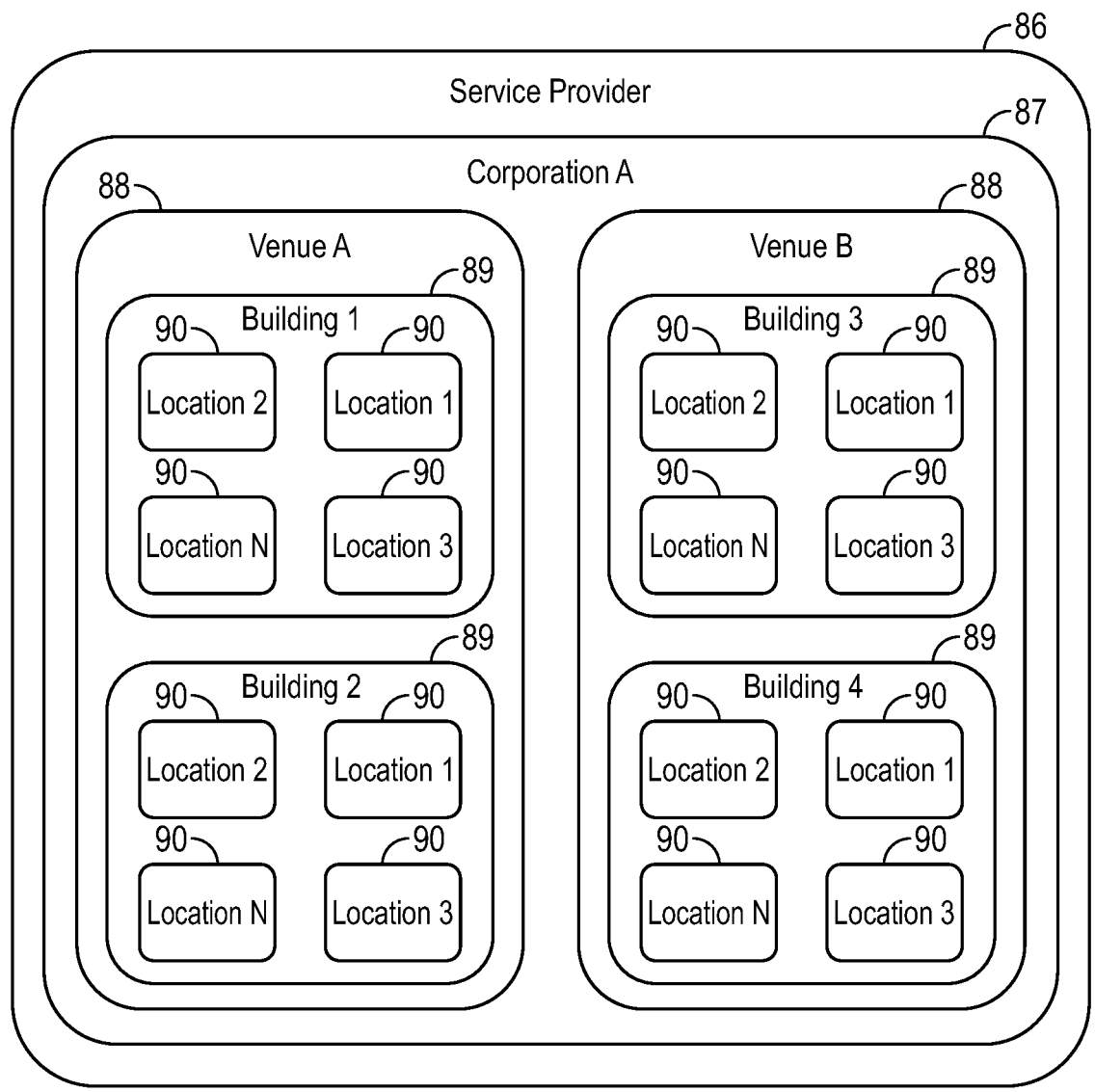
FIG. 5 illustrates a location hierarchy employed according to an aspect of the system of the present disclosure.

In reference to FIG. 5, the system contains a location hierarchy, which is designed to be fully customizable to any corporation's or facility's structure. The broadest level of the hierarchy is the Service Provider level 86, which may also be referred to as the client organization entity. Within Service Provider 86 there may be at least one organization, such as Corporation 87, which may be the same as the Service Provider or may be a client of the Service Provider on whose behalf, the Service Provider is performing services. Each Corporation 87 may have at least one Venue 88, which may be as broad as a university campus, or as specific as a single airport. The definition of a Venue 88 may be determined by the given client organization. Within a Venue 88 there may be Building 89, the exact definition of which may be subjective depending on the needs of the given client. For example, Buildings (1-4) 89 may be used to represent terminals within an airport venue, or specific structures across an office campus or school campus. Within each Building 89 there may be at least one Location 90, for which events throughout the system of current invention may be created and allocated. The definition of a location may be as subjective as the levels of the location hierarchy. For example, a location could be a restroom, a conference room, an individual store in a mall, etc., depending on the needs of the client in question.

Cleaning Module

FIG. 1 illustrates the process of completing a cleaning alert. Cleaning alerts 1 may be system generated based on the analysis of existing data sets provided by various sensors and inputs or may be manually generated by a client end user. The purpose of the system of current invention's cleaning module may be to facilitate the creation, assignment, conduction, and completion of a scheduled or ad-hoc cleaning event by an end user. This end user will be herein referred to as a Custodian for the remainder of this document. In the upcoming exemplary scenarios, it is assumed that all configurable feature options that may be available through the system of current invention may be available to the Custodian. It is further assumed that the Custodian is actively logged in to an instance of the system's mobile component and has done so with a valid set of user credentials. Further, it is assumed that "Venue" in this scenario is defined as Airport, "Building" is defined as Terminal A, and "Location" is defined as Men's Restroom. Finally, it is assumed that a schedule for cleaning events in the Venue are configured and assigned.

For the purposes of this example, it is assumed that a cleaning alert at Step 1 is generated from a schedule for the Men's Restroom within Terminal A at an airport and is assigned to the Custodian at Step 2. When the time of the scheduled alert has been reached at Step 3, the Custodian is notified of the assigned alert at Step 4 and is prompted to accept or decline the alert. The Custodian accepts the alert at Step 5 and the system then displays the destination, here Men's Restroom, of the cleaning alert at Step 6. In one aspect, the alert signal may contain destination information and other information, such as assigned tasks discussed below. In another aspect, such information may be sent in separate transmissions. The Custodian travels to the Men's Restroom at Step 7 and upon arrival, if an electronic beacon device communicating over a protocol, e.g., BLUETOOTH®, (Yes/No Step 8) has been placed in or near and assigned to the Men's Restroom (Yes Step 8), the Custodian's mobile device may scan for or otherwise communicate with the beacon to mark the presence of the Custodian at the Men's Restroom automatically at Step 10.

In various aspects, either the beacon or Custodian's mobile device may transmit a beacon signal and the other device may receive the beacon signal and report to the server. In one example, the beacon may receive a signal from the Custodian's mobile device. The receiving beacon may be part of a network formed of one or more beacons, and the receiving beacon can communicate the presence of the Custodian's mobile device at the receiving beacon's location to the server, e.g., via an internet gateway device.

In another example, the beacon may transmit a signal to the Custodian's mobile device, and the Custodian's mobile device may transmit a signal to the server via one of various communication networks, whereby the server will mark the presence of the Custodian's mobile device at the beacon's location.

In yet another aspect, the Custodian's mobile device may transmit location information to the server without communication with the beacon, i.e., the mobile device may use a combination of one or more of GPS, cellular, and/ or Wi-Fi or other location or communication systems to identify its location and communicate with the server.

In one aspect where a beacon is not assigned to the Men's Restroom (No Step 8), the Custodian via the software application may be provided with a screen to acknowledge they have reached the Men's Restroom at Step 9. In either case, the Custodian may be presented with a feedback screen (Yes/No Step 11) to provide their assessment of the conditions (Yes Step 11) of the Men's Restroom at Step 12. This step is not mandatory and may be skipped (No Step 11). Next, the Custodian may be presented with a list of assigned tasks (Yes/No Step 13) to complete during their cleaning alert. The Custodian may select tasks (Yes Step 13) completed at Step 14 or may skip this step if no tasks were completed (No Step 13). A screen may then appear listing inventory that has been allocated to the Custodian for use when completing cleaning alerts (Yes/No Step 15). The Custodian may enter values for any amounts of inventory (Yes Step 15) that were used at Step 16 or may skip this step if no inventory items were used (No Step 15). Next, the Custodian may be prompted to enter any comments (Yes/No Step 17) related to their work at the Men's Restroom or the condition of the Men's Restroom upon their leaving. The Custodian may add their comments (Yes Step 17) at Step 18 or skip this step (No Step 17) and mark the cleaning alert as complete at Step 19. The system may then process the information provided by the Custodian and store the data at Step 20 in the appropriate data warehouse for the subscription owned by the airport.

Web-Based Cleaning Configuration

The concept behind the system of current invention's web component is to provide users who are granted administrative permissions, who may be referred to as Client Administrators throughout the remainder of this document, with the ability to customize the system's workflow and datasets utilized within the workflow to best fit the needs of their facility or group of facilities.

Figure 6:
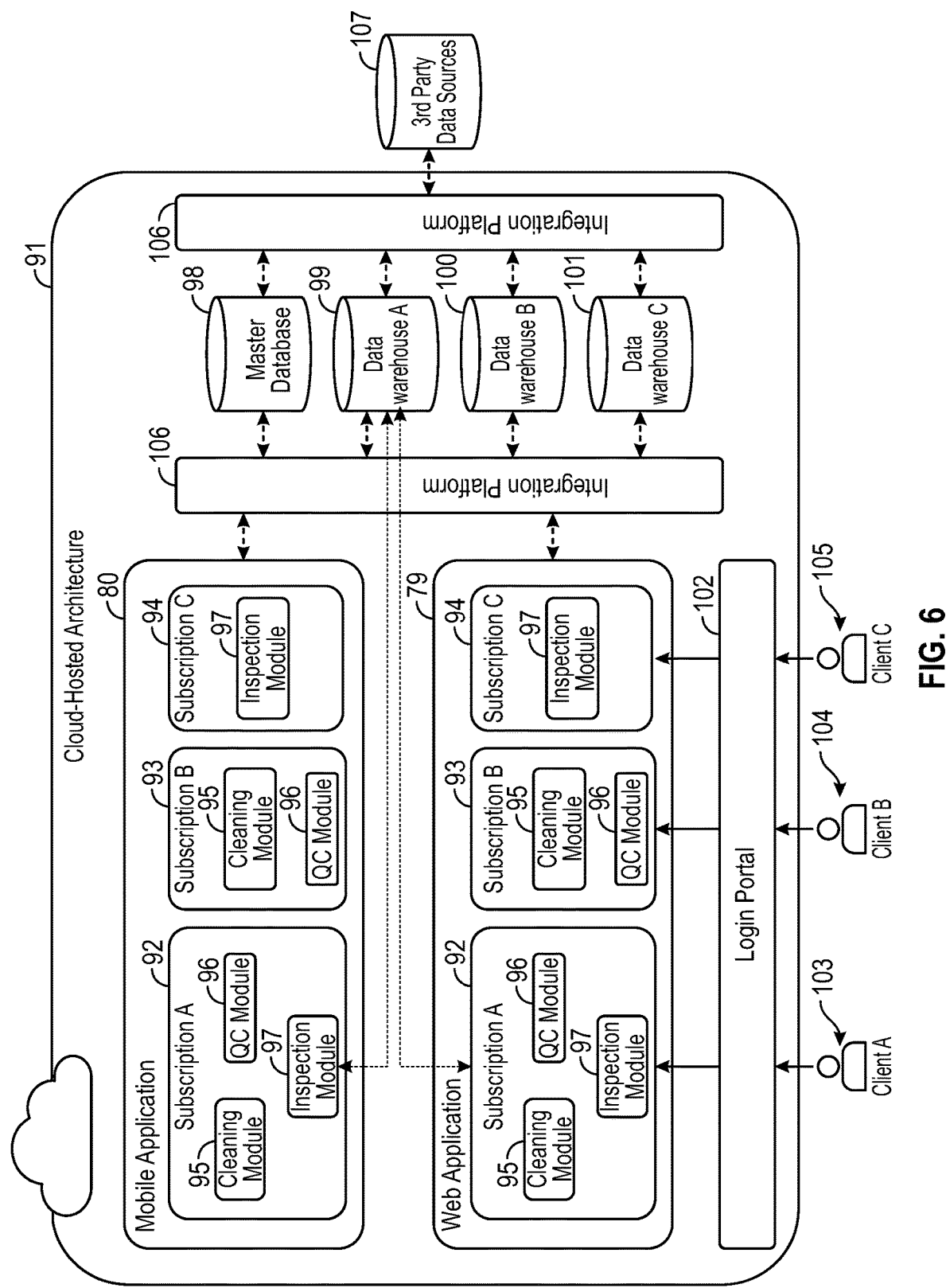
FIG. 6 illustrates an exemplary cloud architecture scheme according to an aspect of the system of the present disclosure.

The cleaning module 95 as depicted in FIG. 6 may include a web component that is available to a specified, authorized user or collection of users employed by or within a facility or group of facilities. This portion of the system may be intended for use by administrative and supervisory users, thus providing access to areas of the system that may not be accessible through the mobile component. This component may facilitate the configuration of the module's various datasets, evaluation and visualization of both real-time and historical data, and management of end users and facility location hierarchies. This may include business intelligence reporting views, user management capabilities, location management capabilities, and schedule management. The web and mobile platforms may be linked via API connection that allows the exchange and maintenance of data.

FIG. 1 illustrates an exemplary process for end user interaction with the cleaning module according to an aspect of the system of the present disclosure. In reference to FIG. 1, a Client Administrator may be able to indicate the use or lack thereof of beacons within the system of current invention at Step 8. For optimal performance and user experience while employing the system of current invention, it may be recommended that end users utilize the tracking abilities of BLUETOOTH® Low Energy (BLE) beacons. The system may be compatible with other wireless solutions (e.g., 3G, 4G, Wi-Fi, RFID, etc.) but highly precise data collection and accuracy may found with the employment of BLE-based hardware. If third-party hardware is selected, the individual hardware components may be registered within the system of current invention's web component. This may allow at least one beacon to be assigned to each individual location within a facility. Multiple beacons are possible and may be recommended for larger locations. If hardware of that variety is not desired, accommodations are provided within the mobile component of the system to bypass the lack of signal to the end user's mobile device.

The existence of beacon hardware (Yes, Step 8) allows for the system to scan for the beacon signal in question at Step 10 until the active mobile device enters the beacon's range. Range is a subjective value that may be configured for or by the Client Administrator based on their personalized facility needs. If third party hardware is not desired, a provision to proceed can be made via the web component at Step 9, thus reflecting in the mobile component, allowing the workflow of the given module to continue without detecting signals exuded via tertiary hardware. A Client Administrator may also be able to configure whether they would like their Custodial end users to provide their feedback of the location in question at Step 11. If enabled (Yes, Step 11), Custodians may be prompted to provide their initial opinion of the state of the location to which they have been assigned to perform a cleaning event at Step 12. If disabled (No, Step 11), the step is excluded from the system of current invention's workflow for the subscription in question.

The web component within the system of current invention may permit a Client Administrator to include a pre-configured Task List within their specific instance of the system. Tasks may be included in the system at the discretion of the Client Administrator at Step 13. If Tasks are desired, they may be configured at two distinct points within the location hierarchy. Per FIG. 5, Task Lists may be first created at the Venue level 88 to best accommodate the differing needs of various venues within a single corporate entity 86. The Venue Task list may then be further specified within the web component by applying certain Tasks to each existing Location 89 within the overarching Venue. This may allow for customization based on the type of Location (e.g., "Clean the urinals" is a Task that would apply to a Men's Restroom, but likely not to a Women's Restroom). Returning to FIG. 1, disabling the Task at Step 13 will remove the Task List from the Custodian user's mobile component workflow.

Continuing in FIG. 1, following the completion or bypassing of Tasks at Step 13, the system of current invention may also be capable of maintaining a facility's Inventory usage data, e.g., received at Step 17, if the Client Administrator so chooses. If active, a Client Administrator may configure a Venue-level Inventory List, followed by further specification of Inventory per Location. If de-activated, the workflow for the subscription in question may not provide Custodial end users with the option to denote Inventory items used throughout the duration of a cleaning event. The final point of configuration that may be provided to a Client Administrator within the system of current invention's web component is to determine whether Custodians may be given the option and permitted to provide their own free-form comments at Step 17 on the location prior to completing their assigned cleaning event. If activated, the Custodian may choose to enter commentary. If de-activated, the comment portion may be omitted from the workflow of the subscription in question.

Quality Control Module

The concept of the quality control (QC) module that may be included in the system of current invention is that evaluation of work done, especially regarding cleaning and sanitization of a facility or group of facilities, must be compliant with the standards and regulations of the parent or managing organization in question. Bearing in mind that standards and regulations may vary from industry to industry and facility to facility, the system of current invention may provide the end users responsible for conducting and interacting with the system's QC module with a workflow process that is indicative of that configured for the cleaning module. This may ensure continuity and accuracy across the pair of modules, as well as across the system. Throughout the remainder of this document, end users who may be responsible for interacting with the QC module mobile component and conducting the related QC events may herein be referred to as Supervisors.

Upon the completion of a cleaning event via the system of current invention's mobile component, a QC event may be initiated and assigned to the appropriate Supervisor user to ensure the work completed throughout the cleaning event is compliant with organizational and/or facility standards and regulations.

Web Quality Control Configuration

The concept behind the system of current invention's QC module web component is to provide specific users, who may be referred to as Client Administrators, with the ability to customize the system's workflow and datasets utilized within the workflow to best fit the needs of their facility or group of facilities. The proceeding scenario assumes that all configurable portions of the cleaning module web component are activated and received accurate information as provided by the Custodian responsible for the given cleaning event. The QC module within the system of current invention may include a web component that is available to Client Administrator. This component may facilitate the customization and configuration of the evaluation process for cleaning events as completed by a Custodian within a specified Location in a facility. The proceeding elaboration of the QC module's web component assumes that all configurable points within the cleaning module web component are configured to be active throughout the duration of a cleaning event.

In this example, it is assumed that a Supervisor has been granted access by their respective Client Administrator to perform all permissible tasks and evaluate all available data that is available for use within the system of current invention's QC module. It is further assumed that beacons are employed throughout the facility in question and that the end user, referred to throughout as Supervisor, has been successfully authenticated and authorized to access the system of current invention's mobile component. Finally, this example assumes that the workflow in question was configured in a way such that QC events are initiated upon the completion of a cleaning event by a Custodian who is permitted to perform all configurable aspects within the web component of the system of current invention's cleaning module at Step 21 in FIG. 2.

Figure 2:
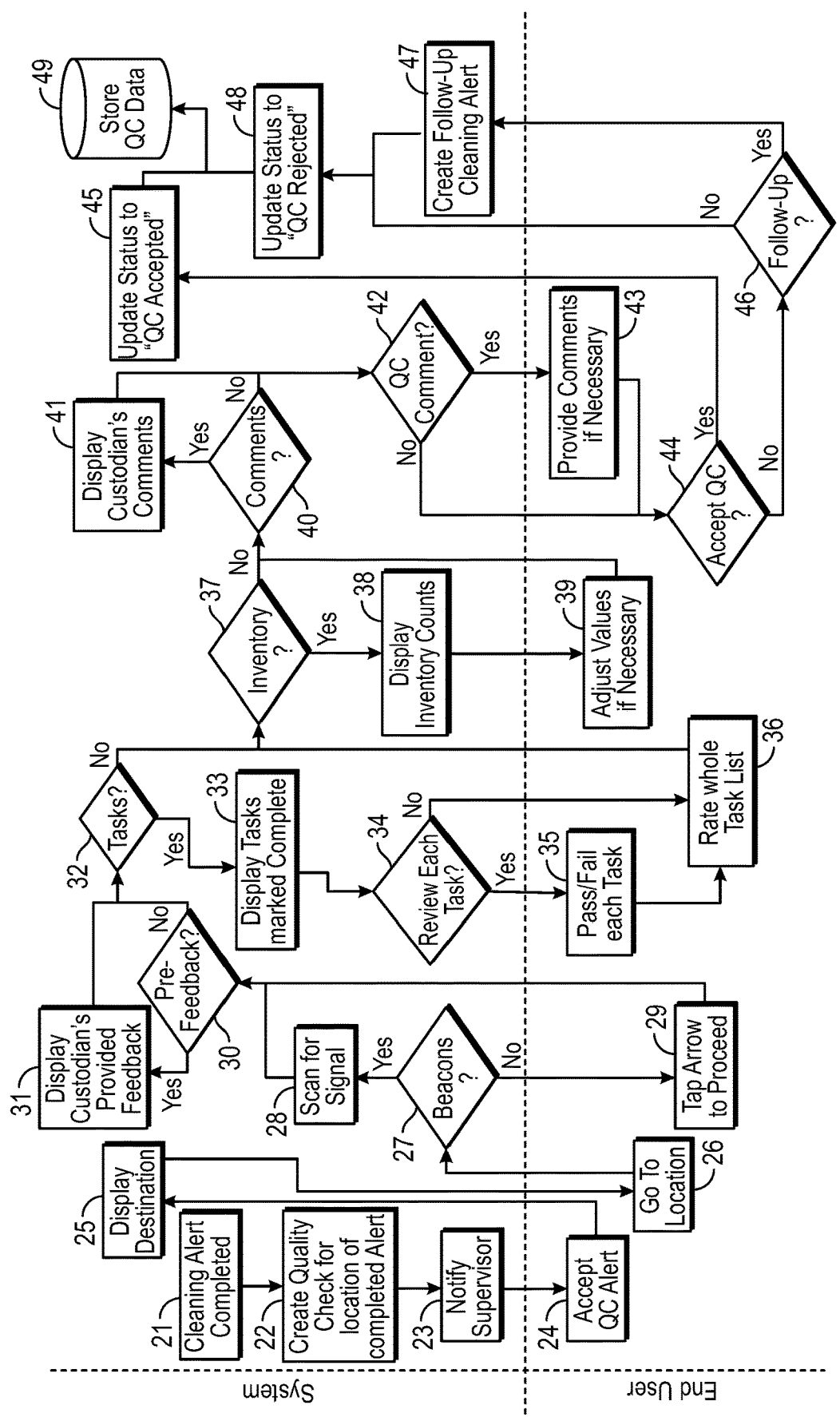
FIG. 2 illustrates an exemplary process for end user interaction with the quality control module according to an aspect of the system of the present disclosure.

Referring to FIG. 2, upon the creation of a QC event at Step 22 and the assignment of said QC event to the appropriate Supervisor, be it via manual entry or via the system of current invention's logic, a notification may be delivered at Step 23 to the mobile device possessed by Supervisor user of choice. The Supervisor may subsequently accept the QC event assignment at Step 24, which may initiate a display of the location at Step 25 for which the initial cleaning event, thus the recently initiated QC event, was created. Upon the Supervisor's arrival at the location, the QC module's mobile component may detect the signal of the beacon at Step 28 to which the location in question is allocated. Upon detection of the given beacon's signal, the mobile component may proceed to the subsequent portion of the workflow in which the Supervisor may evaluate the feedback provided by Custodian at Step 31 responsible for performing the initial cleaning event. Continuing through the QC module's mobile component, the Supervisor may evaluate the Tasks that the assigned Custodian denoted as completed at Step 33 throughout the process of their cleaning event. The Supervisor may then be able to evaluate each Task in turn at Step 34, most commonly in a manner reminiscent of a Pass/Fail review at Step 35. In addition to this granular level of performance metrics, the Supervisor may also provide an evaluation of the overall performance of the Custodian at Step 36.

In continued reference to FIG. 2, upon the Supervisor's completion of their evaluation of the Custodian's Task performance the Inventory values at Step 37 provided during the cleaning event by which this exemplary QC event was created, may be displayed for further review at Step 38. The system of current invention's QC module may provide the Supervisor with the inventory items for which values had been provided by the Custodian throughout the cleaning event. If the Supervisor identifies an error in the provided inventory data, they may adjust the numeric value provided at Step 39 to maintain the most accurate possible data. Following the Inventory evaluation, at Step 42 the QC module's mobile component provides the Supervisor with any comments that may have been left by the performing Custodian in Step 41, as well as allow the Supervisor to include additional comments at Step 43 that may be supplemental to the data previously evaluated. After proceeding through and evaluating all available datasets provided by the system of current invention's QC module, the Supervisor may choose to accept or reject at Step 44 the quality of work completed by the Custodian throughout their cleaning event. Per a satisfactory performance, the QC event may be accepted by the Supervisor, updated accordingly at Step 45, and the evaluation data recently completed may be insert into the respective subscription's allocated database at Step 49. Contrarily, the Supervisor may reject the quality of work completed by the Custodian due to unsatisfactory performance and failure to meet organizational or facility standards and regulations. In the event of a rejection, the system's QC module may provide the performing Supervisor with the option to initiate the creation of a follow-up cleaning event at Step 46. Should the Supervisor choose to create another cleaning event for the location in question, they may do so at Step 47, creating a cleaning event and assigning it to the same location and Custodian as the initial cleaning event the completion of which triggered the creation of the current exemplary QC event. Alternatively, the Supervisor may opt not to create another cleaning event and complete their QC event by rejecting the quality of work at Step 48 without a follow-up. In both the case of acceptance of a QC and event and the case of rejection of a QC event, the accrued data may be stored in the given subscription's allocated database at Step 49.

FIG. 2 illustrates an exemplary process for end user interaction with the quality control module according to an aspect of the system of the present disclosure. With reference to FIG. 2, the employment of beacons at Step 27 within the subscription instance in question initiates behavior replicating that of the cleaning module web component. If beacon hardware exists; the system may scan for the distinct signal at Step 28 emitted from the beacon or beacons specifically allocated to the location in question. In the event of a lack of beacon hardware, and identically to the behavior of the cleaning module within the system of current invention, a provision may be made within the system's user interface at Step 29 for the Supervisor to proceed to the next stage in their mobile component sequence. In further accordance with the configuration of the cleaning module within the system, the Supervisor may be able to view the rating data provided by the Custodian at Step 31 who conducted the cleaning event, the completion of which triggering the currently on-going QC event.

Continuing in FIG. 2, the Supervisor's evaluation of Custodian feedback at Step 31 may be followed by the Supervisor's evaluation of the Tasks at Step 32 that were completed during the initial cleaning event, as denoted by the Custodian who performed said Tasks. Within the system of current invention's QC module, it may be possible to further specify the level of granularity necessary to perform a QC event that enforces the Supervisor's organizational standards and regulations. A Client Administrator may decide, via configuration within the system's web component, at Step 34 to permit their Supervisor end users to either review solely the cumulative quality of work completed during the cleaning event at Step 36, or to review the quality of each Task individually at Step 35 in addition to the overall quality of the work completed at Step 36. The Client Administrator may further control the Supervisor's visibility into any Inventory at Step 37 data provided by the Custodian responsible for performing the initial cleaning event. If visibility into Inventory data is provided, it may be displayed to the Supervisor at Step 38. If visibility into inventory data is not provided, the related section of the system's workflow may not be provided to the Supervisor. Replicating the inventory behavior, the Client Administrator may allow or deny the Supervisor user any visibility into the comments at Step 40 that may have been left by the Custodian. In the event visibility is allowed, the provided comments or lack thereof may be displayed for the Supervisor at Step 41. The final configurable point provided to the Client Administrator within the web component of the system's QC module determines the Supervisor user's ability or inability to provide comments at Step 42 based on the data they evaluated throughout their QC event. If permitted, the Supervisor may manually enter any additional information at Step 43 they may find to be supplementary or beneficial regarding the QC event.

Inspection Module

The concept of the inspection module within the system of current invention is that evaluating assets and elements within a facility's multitude of internal systems should be simple to conduct and review, as well as conducted with the largest amount of relevant historical data possible. The system of current invention provides data to the end user that may include the most recent cleaning performed and most recent quality control report conducted, as well as the ability to configure the system's workflow to specific corporation or facility needs.

Bearing in mind that standards and regulations may vary from industry to industry and facility to facility, the system of current invention may provide the end users responsible for conducting and interacting with the system's Inspection module with a workflow process that is indicative of that configured for the QC module. This may ensure continuity and accuracy across the entirety of the system. Throughout the remainder of this document, end users who may be responsible for interacting with the inspection module mobile component and conducting the related inspection events may herein be referred to as Inspectors.

One example of how the mobile component of the inspection module within the system of current invention may be used is related to the process of evaluating and maintaining elements that may exist in a restroom location. In this example it is assumed that beacons are configured appropriately for and accurately assigned to the restroom location in which the inspection event will occur. Additionally, the Inspector assigned to the inspection event in question has already been determined and the configurable details within the workflow have been added appropriately to the system. It is further assumed that the system's cleaning module and QC module are active and configured with the necessary datasets for optimal performance within the inspection module. Finally, it is assumed the active Inspector in the following exemplary scenario has accessed the inspection module's mobile component via a mobile device with a valid set of user credentials, an inspection event has been scheduled, and the inspection event in question has already been assigned to the active Inspector.

Figure 3:
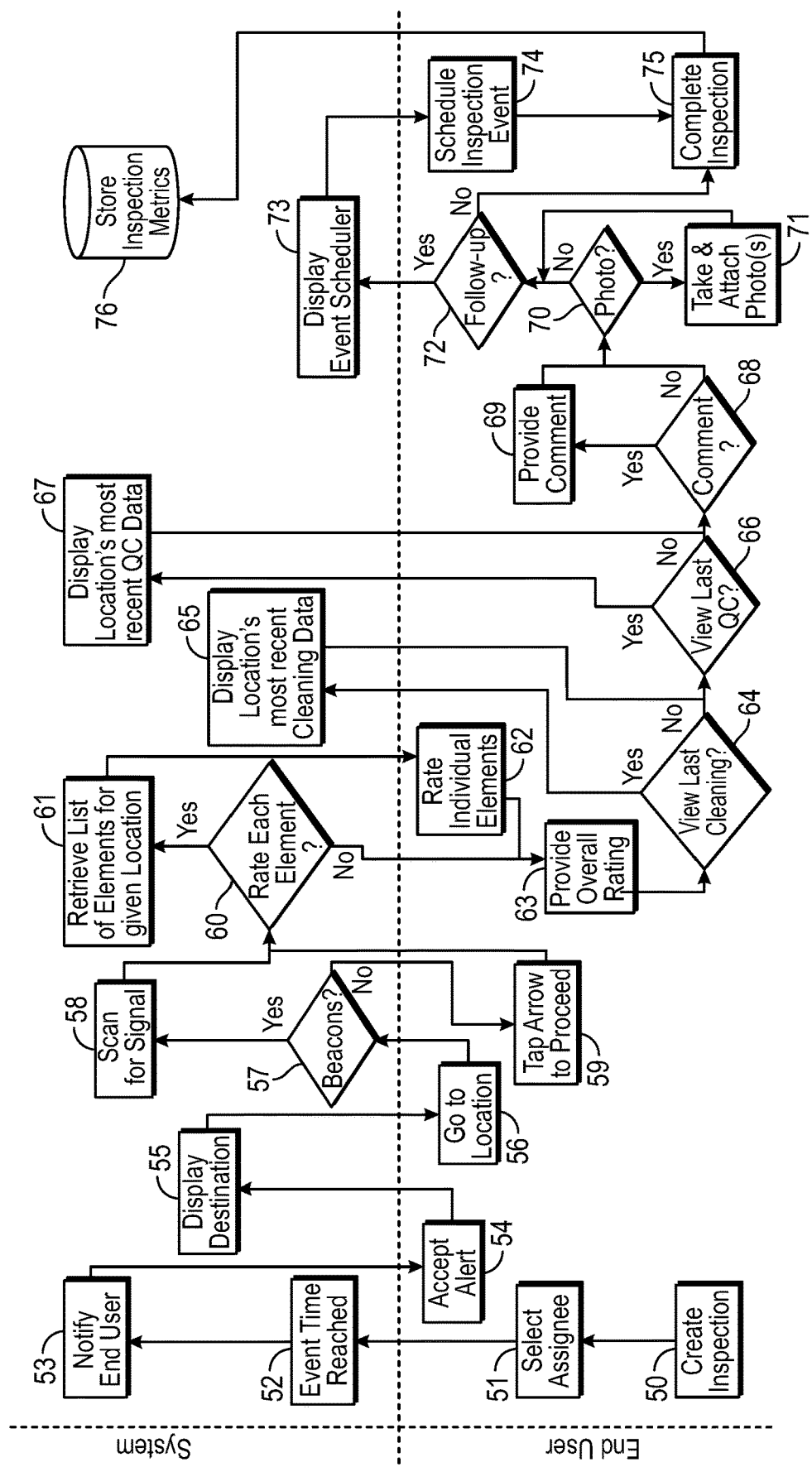
FIG. 3 illustrates an exemplary process for end user interaction with the inspection module according to an aspect of the system of the present disclosure.

FIG. 3 illustrates an exemplary process for end user interaction with the inspection module according to an aspect of the system of the present disclosure. Referring now to FIG. 3, an inspection event may be created at Step 50 and assigned to the appropriate Inspector at Step 51. Similarly to the behavior of events within the modules, a start time for the inspection event may be specified during the scheduling process. When the scheduled time for the inspection event is reached at Step 52, the chosen Inspector may receive a push notification via the system of current invention's notification engine at Step 53 to alert them of the upcoming event. The Inspector may then accept the assigned inspection event at Step 54, at which point the mobile component of the inspection module may display the location for which the inspection event was created at Step 55. The system's mobile component may begin to scan for the signal of the beacon at Step 58 which has been allocated to the location in question. Upon detection of the beacon's signal, the inspection module's mobile component may prompt the Inspector to begin their evaluation of the various elements at Step 60 within the location. The Inspector may rate each Element individually at Step 62 on a scale that is determined by the Client Administrator to maintain continuity with metrics that may already exist from inspection events that may have occurred historically outside the system of current invention. Furthermore, every element may be assigned a percentage or weight valuation depending on its level of importance to the Client Administrator. In addition to this level of granularity, the Inspector may provide his review of the Location's Elements as a cumulative whole at Step 63.

In continued reference to FIG. 3, the Inspector may have access to two datasets procured from the cleaning module and QC module, respectively. The Inspector may view data and metrics collected during the most recent cleaning event performed at the Location in which the inspection event occurs at Step 64. The Inspector may also view data and metrics collected during the most recent QC event performed at the Location at Step 66. Upon completion of the Inspector's evaluation of the Elements and any relevant historical data, he may be able to provide additional commentary at Step 68 by means of manual entry to supplement the evaluation provided at Step 69. If so desired, the Inspector may also capture visual media through their mobile device's built-in camera at Step 71. The mobile component of the inspection module may also permit the Inspector to create a follow-up inspection event at Step 72 if deemed necessary. If desired, the Inspector may schedule another inspection event at Step 74 for the same Location in which they have just completed the active inspection event. Upon completion of the inspection event at Step 75 within the system's inspection module mobile component, the data collected throughout the recently concluded inspection event may be stored in the database at Step 76 allocated to the appropriate subscription.

The first point of configuration available to a Client Administrator via the inspection module's web component is related to the specific assets, herein referred to as Elements, under evaluation. As mirrored in the Task and Inventory configuration points, Elements may be configured first at the Venue-level of the system of current invention's location hierarchy, allowing the system's datasets to be customized to the needs of a given facility or group of facilities. For increased data granularity, the Elements may then be assigned at the Location-level to facilitate the creation of custom templates that may best align with the type of location. Upon establishment of a Location's Elements, thus implying the configuration of a Venue's Elements, the Client Administrator may configure their preferred method for evaluating a Location's Elements at Step 61. The Client Administrator may configure their instance of the inspection module in such a way that an Inspector is permitted to rate the status of each individual Element type at Step 63. Alternatively, the Client Administrator may only permit the Inspector to provide their overall rating of the Location's Elements at Step 64 if they so choose.

A Client Administrator may also be able to activate or de-activate an Inspector's access to the system's historical data. If desired, data and metrics collected throughout the Location in question's most recently completed cleaning event at Step 65 may be offered to the Inspector as they engage with the inspection module. The same access to the Location in question's most recent QC event at Step 67 may also be permitted at the discretion of the Client Administrator. Additionally, the inspection module web component within the system of current invention further reflects the configurability of the modules by giving the Client Administrator the ability to activate or de-activate an Inspector's permission to provide comments at Step 69 in an inspection event. The same level of configuration may be available with the inclusion of visual media in the inspection event at Step 71.

Web Inspection Configuration

The web component of the system of current invention's inspection module is intended for use primarily by the Client Administrator user of a given subscription for optimal configuration and customization of the system's workflow and processes. The preceding scenario assumes that all configurable portions of the cleaning module web component and QC module web component are activated and received accurate information as provided by the Custodian responsible for the given cleaning event and the Supervisor responsible for the given QC event. It is not, however, required or necessary for the preceding cleaning and QC modules to be active and engaged with the inspection module. The scenarios employed are indicative of a single instance or embodiment of the inspection module within the system of current invention.

Web View Dashboard for Multi-Venue Deployments

If the user of the system has deployed modules at multiple buildings or venues within an organization, then the system may provide the user with a visual dashboard that indicates ratings or scores of each building. The intent of this feature is to provide an enterprise corporation a single view of the performance across multiple venues.

This dashboard may highlight the overall score for each venue, where the score may be calculated as an average of the inspections conducted at that venue. There may be a list of each location within a building in which the modules are utilized. If there is a location highlighted, e.g., in red, it indicates that an area failed an inspection, and/or the Inspector conducting the inspection issued a Cleaning Alert to the janitor to proceed back to that location for the identified deficiency.

What is claimed is:

1. A method for performing maintenance of a facility for use with a server, a plurality of BLUETOOTH communication sensors arranged throughout the facility, and a portable communication device, the method comprising:
   a. transmitting a cleaning signal from the server to the portable communication device where the cleaning signal comprises information regarding one of an identity and location of a target location within the facility;
   b. transmitting an acceptance signal associated with the target location from the portable communication device to the server in response to receiving the cleaning signal;
   c. transmitting a beacon signal from one of the plurality of BLUETOOTH communication sensors to the portable communication device, where the transmitting BLUETOOTH communication sensor is fixedly located at or proximate to the target location and where the beacon signal contains identifying information;
   d. transmitting an arrival signal from the portable communication device to the server in response to receiving the beacon signal;
   e. transmitting one or more assigned tasks associated with the target location from the server to the portable communication device;
   f. transmitting one or more first comments associated with the target location from the portable communication device to the server;
   g. transmitting one or more completed tasks associated with the target location from the portable communication device to the server;
   h. transmitting one or more consumed inventory associated with the target location from the portable communication device to the server;
   i. transmitting one or more second comments associated with the target location from the portable communication device to the server; and
   j. transmitting a completion signal associated with the target location from the portable communication device to the server. k. transmitting an inspection signal from the server to a second portable communication device in response to the completion signal where the inspection signal comprises information regarding one of the identity and location of the target location within the facility, where the inspection signal triggers an alert at the second portable communication device;
   l. transmitting an acceptance signal associated with the target location from the second portable communication device to the server in response to receiving the inspection signal;
   m. transmitting a beacon signal from one of the plurality of BLUETOOTH communication sensors to the portable communication device, where the transmitting BLUETOOTH communication sensor is fixedly located at or proximate to the target location and where the beacon signal contains identifying information;
   n. transmitting an arrival signal from the second portable communication device to the server in response to receiving the beacon signal;
   o. transmitting the one or more assigned tasks associated with the target location from the server to the second portable communication device;
   p. transmitting a review for one or more of the one or more assigned tasks associated with the target location from the second portable communication device to the server; and
   q. transmitting a quality control status signal associated with the target location from the second portable communication device to the server.

2. The method of claim 1, wherein the arrival signal comprises information included in or based on the beacon signal.

3. A method for performing maintenance of a facility for use with a server, a plurality of BLUETOOTH communication sensors arranged throughout the facility, and a portable communication device, the method comprising:
   a. transmitting a cleaning signal from the server to the portable communication device where the cleaning signal comprises information regarding one of an identity and location of a target location within the facility;
   b. transmitting an acceptance signal associated with the target location from the portable communication device to the server in response to receiving the cleaning signal;
   c. transmitting a beacon signal from the portable communication device to one of the plurality of BLUETOOTH communication sensors that is fixedly located at or proximate to the target location and where the beacon signal contains identifying information;
   d. transmitting an arrival signal from the one of the plurality of BLUETOOTH communication sensors that is fixedly located at or proximate to the target location to the server in response to receiving the beacon signal;
   e. transmitting one or more assigned tasks associated with the target location from the server to the portable communication device;
   f. transmitting one or more first comments associated with the target location from the portable communication device to the server;
   g. transmitting one or more completed tasks associated with the target location from the portable communication device to the server;
   h. transmitting one or more consumed inventory associated with the target location from the portable communication device to the server;
   i. transmitting one or more second comments associated with the target location from the portable communication device to the server;
   j. transmitting a completion signal associated with the target location from the portable communication device to the server;
   k. transmitting an inspection signal from the server to a second portable communication device in response to the completion signal where the inspection signal comprises information regarding one of the identity and location of the target location within the facility, where the inspection signal triggers an alert at the second portable communication device;

l. transmitting an acceptance signal associated with the target location from the second portable communication device to the server in response to receiving the inspection signal;

m. transmitting a beacon signal the second portable communication device to one of the plurality of BLUETOOTH communication sensors that is fixedly located at or proximate to the target location and where the beacon signal contains identifying information;

n. transmitting an arrival signal from the one of the plurality of BLUETOOTH communication sensors that is fixedly located at or proximate to the target location to the server in response to receiving the beacon signal;

o. transmitting the one or more assigned tasks associated with the target location from the server to the second portable communication device;

p. transmitting a review for one or more of the one or more assigned tasks associated with the target location from the second portable communication device to the server; and q. transmitting a quality control status signal associated with the target location from the second portable communication device to the server.

4. The method of claim 3, wherein the arrival signal comprises information included in or based on the beacon signal.

* * * * *